(12) United States Patent
Yamamoto et al.

(10) Patent No.: US 7,300,078 B2
(45) Date of Patent: Nov. 27, 2007

(54) PIPE JOINT CLAMP

(75) Inventors: Tomohiro Yamamoto, Nagoya (JP); Koji Hisaka, Anjo (JP)

(73) Assignee: DENSO Corporation, Kariya (JP)

( * ) Notice: Subject to any disclaimer, the term of this patent is extended or adjusted under 35 U.S.C. 154(b) by 85 days.

(21) Appl. No.: 11/190,024

(22) Filed: Jul. 26, 2005

(65) Prior Publication Data

US 2006/0022467 A1 Feb. 2, 2006

(30) Foreign Application Priority Data

Jul. 28, 2004 (JP) ............................... 2004-220652

(51) Int. Cl.
*F16L 19/00* (2006.01)
(52) U.S. Cl. ........................ 285/420; 285/403; 285/364
(58) Field of Classification Search ................ 285/305, 285/374, 403, 400, 399, 420, 364
See application file for complete search history.

(56) References Cited

U.S. PATENT DOCUMENTS

| | | | | |
|---|---|---|---|---|
| 3,479,069 A | * | 11/1969 | Sedam | ........................ 285/364 |
| 4,452,097 A | * | 6/1984 | Sunkel | ........................ 74/502.4 |
| 4,795,197 A | * | 1/1989 | Kaminski et al. | ............. 285/12 |
| 5,015,013 A | * | 5/1991 | Nadin | ........................ 285/64 |
| 5,320,391 A | * | 6/1994 | Luthi | ........................ 285/365 |
| 5,647,612 A | | 7/1997 | Yoshida et al. | |
| 6,539,920 B1 | * | 4/2003 | Spiers | ........................ 123/456 |

* cited by examiner

*Primary Examiner*—David Bochna
(74) *Attorney, Agent, or Firm*—Harness, Dickey & Pierce, PLC

(57) ABSTRACT

A pipe joint clamp for connecting piping members includes a circular holding portion in which flange portions of the piping members are clamped, and multiple flexion-shaped hinge portions, which protrude from the holding portion toward a diametrically outer side thereof. The hinge portions are resiliently deformable to accommodate a variation of outer diameters of the flange portions. Thus, a protrusion amount of the each hinge portion can be reduced. Accordingly, the space occupied by the clamp at the joint part of the piping members is decreased.

20 Claims, 5 Drawing Sheets

PIPE JOINT CLAMP

CROSS REFERENCE TO RELATED APPLICATION

This application is based on a Japanese Patent Application No. 2004-220652 filed on Jul. 28, 2004, the disclosure of which is incorporated herein by reference.

FIELD OF THE INVENTION

The present invention relates to a pipe joint clamp for connecting piping members.

BACKGROUND OF THE INVENTION

Generally, a clamp is used for connecting piping members, each of which has a flange portion disposed at an end thereof. The clamp is provided with a groove portion which extends in a circumference direction thereof, for example, referring to JP-8-219351A. The flange portions are held in the groove portion to be clamped, so that the piping members are axially fixed to each other.

For example, referring to FIG. 9, a clamp 101 made of a resin includes a circular holding portion 110 for accommodating the flange portions of the piping members, and a flexion-shaped hinge portion 120 which protrudes from the holding portion 110 toward a diametrically outer side thereof.

The hinge portion 120 can be resiliently deformed when the clamp 101 is opened/closed. In this case, the inner diameter of the holding portion 110 is changeable responding to a deformation of the flexion-shaped hinge portion 120, to accommodate the variation of the outer diameters of the flange portions.

However, in the case where the variation of the outer diameters of the flange portions is large, the flexion-shaped hinge portion 120 is to be large-sized to accommodate the variation. Thus, the protrusion amount 'C' of the hinge portion 120 with respect to an outer surface of the holding portion 110 becomes large, so that the space occupied by the clamp 101 at the joint part of the piping members is enlarged.

SUMMARY OF THE INVENTION

In view of the above-described disadvantage, it is an object of the present invention to provide a pipe joint clamp, which occupies a small space and has a flexion portion for adjusting an inner diameter of a holding portion of the pipe joint clamp. The pipe joint clamp is suitably used for connecting piping members respectively provided with flange portions, which are clamped by the holding portion.

According to the present invention, a pipe joint clamp (clamp) for connecting a first piping member and a second piping member includes a circular holding portion in which flange portions of the first and second piping members are clamped, and multiple flexion portions which protrude from the holding portion toward a diametrically outer side of the holding portion. The flange portions are respectively disposed at axial ends of the first and second piping members. The flexion portion having a bending shape is resiliently deformable so that an inner diameter of the holding portion is changeable.

Accordingly, the variation of the outer diameters of the flange portions can be accommodated by a deformation of the flexion portions, while the flexion portions are small-sized. Therefore, the space occupied by the clamp at the joint part of the piping members can be reduced.

Preferably, the holding portion has a first circumferential end (first end) and a second circumferential end (second end), which are separated from each other and capable of being engaged with each other through engagement surfaces thereof. When the holding portion is attached to the flange portions, the engagement surfaces are engaged with each other so that the holding portion is closed. When the holding portion is detached from the flange portions, the engagement surfaces are disengaged from each other so that the holding portion is opened.

Therefore, the holding portion can be readily attached to the flange portions of the piping members, to substantially connect the piping members with each other.

More preferably, the pipe joint clamp further includes an engagement protrusion portion and a positioning rib portion which are arranged at the second end. The positioning rib portion positions the first end when the holding portion is closed. The engagement surface of the second end is formed at the engagement protrusion portion. The positioning rib portion exceeds the engagement surface of the second end in an opening direction of the holding portion.

Therefore, when the first end is rotated toward to the second end to close the clamp, the first end is positioned by the positioning rib portion before the engagement surface of the first end is engaged with that of the second end. Accordingly, the engagement surfaces can be substantially and smoothly engaged with each other.

Preferably, the positioning rib portion has a larger stiffness than that of the engagement protrusion portion.

Thus, when the holding portion is closed, the bending of the positioning rib portion is relatively difficult, while the bending of the engagement protrusion portion is relatively easy. Therefore, the engagement surfaces of the first and second ends can be readily engaged with each other through the bending of the engagement protrusion portion, while the first end is substantially positioned by the positioning rib portion.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

A first embodiment of the present invention will be described with reference to FIGS. 1-5.

Figure 2:
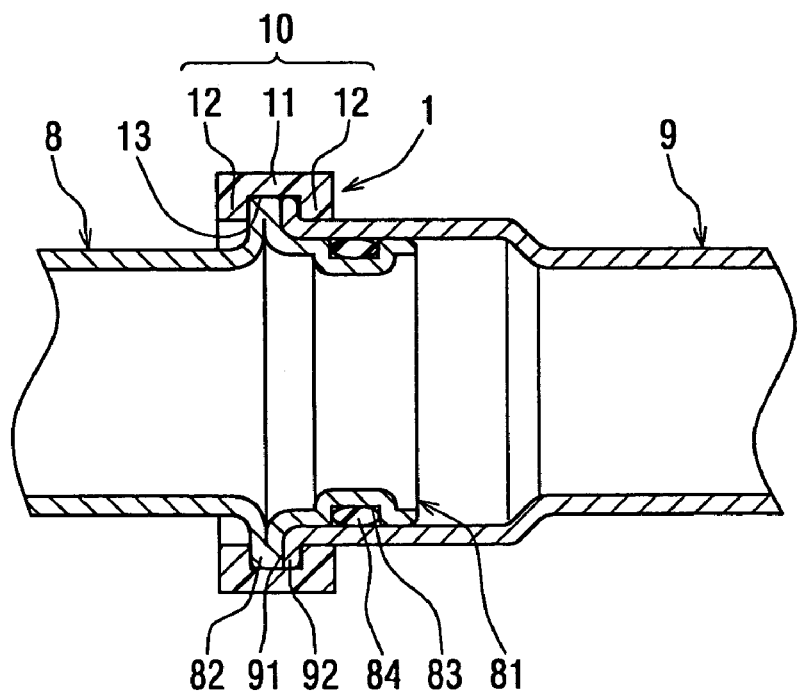
FIG. 2 is an axially cross-sectional view showing piping members which are connected with each other through the clamp 1 according to the first embodiment.

As shown in FIG. 2, a pipe joint clamp 1 (clamp 1) of the present invention is suitably used for connecting a first piping member 8 and a second piping member 9, in which fluid such as cooling water of a vehicle engine flows. The piping members 8 and 9 are made of, for example, an aluminum alloy. The first piping member 8 (male piping member 8) has a male end 81 (axial end), which is inserted into a female end 91 (axial end) of the second piping member 9 (female piping member 9).

The male end 81 is provided with a diameter-enlarged flange portion 82 and a groove portion 83, which is disposed at the side of the second piping member 9 with respect to the flange portion 82. The groove portion 83 circumferentially extends around the male end 81. The female end 91 is provided with a diameter-enlarged flange portion 92.

A sealing unit 84 such as an O-ring is inserted in the groove portion 83. When the male end 81 of the male piping member 8 is inserted into the female end 91 of the female piping member 9, the flange portion 82 will contact the flange portion 92. In this case, the O-ring 84 seals the coupling part between the piping members 8 and 9.

Figure 1:
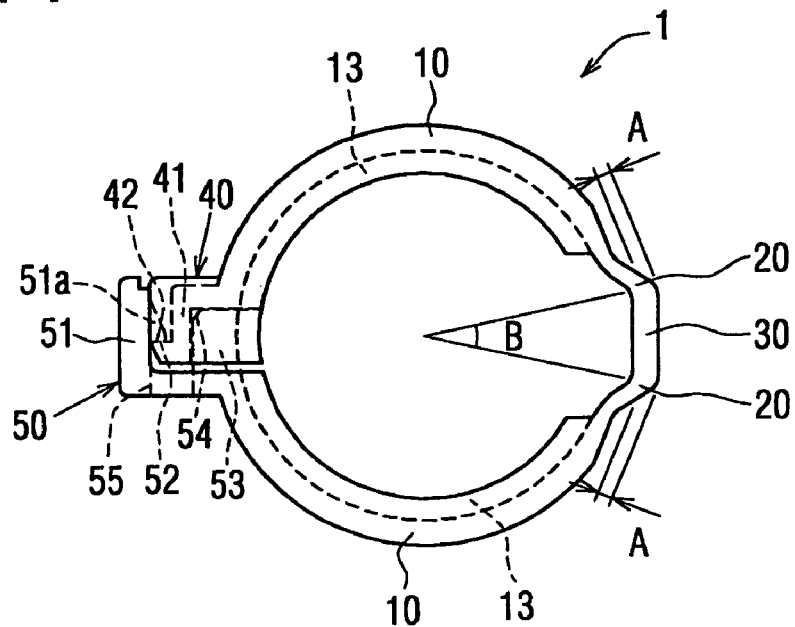
FIG. 1 is a front view showing a construction of a clamp 1 according to a first embodiment of the present invention.

The clamp 1 for joining the piping members 8 and 9 is made of, for example, a resin such as a polypropylene resin and a polyamide resin. As shown in FIG. 1, the clamp 1 includes a holding portion 10, in which the flange portions 82 and 92 are accommodated, multiple hinge portions 20 (e.g., two hinge portions as indicated in FIG. 1) and an intermediate portion 30 having, for example, a plate shape. The intermediate portion 30 is disposed between the hinge portions 20 and connects them with each other. The hinge portions 20 with a flexion shape can be also named flexion portions 20 in the present invention.

The holding portion 10 has two diametrical ends, one of which is divided into two parts (first circumferential end 40 and second circumferential end 50). The other of the diametrical ends is continuous. In this embodiment, the hinge portions 20 and the intermediate portion 30 are disposed at the side of the other of the diametrical ends. The first circumferential end 40 (first end 40) and the second circumferential end 50 (second end 50) can be engaged with and disengaged from each other, so that the holding portion 10 (clamp 1) can be circumferentially closed and opened. Thus, the holding portion 10 is attached to or detached from the flange portions 82, 92.

The holding portion 10 (clamp 1) has a circular shape when being closed. The hinge portions 20 protrude from the holding portion 10 toward the diametrically outer side thereof to have a flexion (bending) shape, for example. A groove 13 is formed at a diametrically inner surface of the holding portion 10 and extends in a circumference direction of the holding portion 10. The flanges 82 and 92 are inserted in the groove 13 to be clamped by the clamp 1 (holding portion 10).

As shown in FIG. 2, the groove 13 formed at the diametrically inner side of the holding portion 10 is defined by two side portions 12 and a bottom portion 11 disposed between the side portions 12, so that the axial cross section of the holding portion 10 has a substantially ' ⊃ ' shape.

Thus, the flange portions 82 and 92 are held in the groove 13 to be clamped by the holding portion 10. Accordingly, the flange portions 82 and 92 are restricted from leaving each other in the axis direction of the piping member 8 (9), so that the piping members 8 and 9 are coupled with each other.

As shown in FIG. 1, each of the bending-shaped hinge portions 20 protrudes from the holding portion 10 toward the diametrically outer side thereof. The hinge portion 20 has a smaller thickness at a thin part thereof which is disposed at the side of the holding portion 10, than those of the bottom portion 11 of the holding portion 10 and the intermediate portion 30. The thickness of the thin part of the hinge portion 20 is also smaller than that of the hinge portion 20 at the side of the intermediate portion 30. When the clamp 1 (holding portion 10) is opened/closed, the thin part of the hinge portion 20 is resiliently deformed. Because the hinge portion 20 having the flexion shape is resiliently deformable, the inner diameter of the holding portion 10 is changeable to accommodate the variety of the outer diameters of the flange portions 82 and 92.

Specifically, in the case where the outer diameter of the flange portion 82 (92) is relatively large, the hinge portions 20 can be resiliently deformed so that the circumferential dimensions of the hinge portions 20 are respectively enlarged. Thus, the holding portion 10 can clamp the flanges 82 and 92. The hinge portions 20 correspond to the flexion portions in this embodiment.

The intermediate portion 30, being a thick part connecting the hinge portions 20, has a thickness which is a substantial double of that of the thin part (at side of holding portion 10) of the hinge portion 20. Thus, the intermediate portion 30 has a larger stiffness than the hinge portion 20, thus being difficultly deformed even when the hinge portion 20 is resiliently deformed.

As described above, the first and second ends 40 and 50 of the holding portion 10 are capable of being disengageably connected with each other responding to a closing and opening of the holding portion 10 when the holding portion 10 is attached to or detached from the flange portions 82, 92.

That is, the first and second ends 40, 50 of the holding portion 10 construct an opening/closed part of the clamp 1 (holding 10). When the clamp 1 is closed, an engagement surface 42 of the first end 40 is engaged with an engagement surface 52 of the second end 50. In this case, the first end 40 is disposed at an upper side of the second end 50. The engagement surface 42 faces upwards, and the engagement surface 52 which is engaged with the engagement surface 42 faces downwards.

Figure 3:
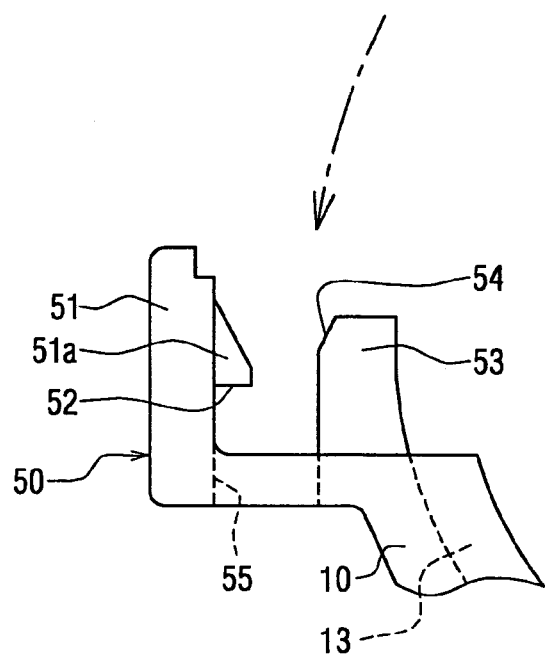
FIG. 3 is an enlarged view showing a second end 50 of the clamp 1 according to the first embodiment.

As shown in FIG. 3, the clamp 1 further includes an engagement protrusion portion 51 where the engagement surface 52 is formed, and a positioning rib portion 53 for positioning the first end 40 when the clamp 1 is closed. The engagement protrusion portion 51 and the positioning rib portion 53 are formed at the second end 50.

In this case, the second end 50 of the holding portion 10 protrudes toward the diametrically outer side of the holding portion 10. The engagement protrusion portion 51 is arranged at the protrusion-direction tip of the second end 50, and extends upward (contrary to the arrow direction indicated in FIG. 3), for example, in the substantial circumference direction of the holding portion 10.

The engagement protrusion portion 51 is provided with a hook portion 51a, which protrudes from the engagement protrusion portion 51 toward the diametrically inner side of the holding portion 10. The engagement surface 52 is constructed of the bottom surface of the hook portion 51a, as shown in FIG. 3.

Referring to FIG. 3, the positioning rib portion 53 is arranged at the second end 50, and upward extends in the substantial circumference direction of the holding portion 10 to exceed the engagement surface 52 in a clamp-opening direction (contrary to the arrow direction indicated in FIG. 3). That is, the positioning rib portion 53 protrudes from the second end 50 toward an opening-direction side of the holding portion 10. The engagement protrusion portion 51 is disposed at the diametrically outer side of the holding portion 10 with respect to the positioning rib portion 53. The positioning rib portion 53 has a larger thickness than the engagement protrusion portion 51, thus having a larger stiffness.

An introduction surface 54 is formed at the extending-direction (i.e., clamp-opening direction) tip side of the positioning rib portion 53. The introduction surface 54, for example, having an incline shape, is shaped to correspond to a rotation locus (indicated as the one-point chain line in FIG. 3) of the first end 40 when the clamp 1 is closed so that the first end 40 contacts the second end 50.

An opening 55 is formed at the second portion 50 and disposed between the positioning rib portion 53 and the engagement portion 51. In this case, the opening 55 is disposed at the lower side of the engagement surface 52, and faces it.

The engagement surface 42 is formed at an engagement portion 41 of the first end 40 and constructed (shaped) to correspond to the engagement surface 52 of the second end 50, so that the engagement surface 42 can be engaged with the engagement surface 52 when the clamp 1 is closed. For example, the first end 40 may protrude from the holding portion 10 toward the diametrically outer side of the holding portion 10 and have two concave parts, in which the hook portion 51a and the positioning rib portion 53 are accommodated when the clamp 1 is closed. The engagement portion 41 may be formed between the concave parts. The engagement surface 42 may be constructed of the top surface (at closed state of clamp 1) of the engagement portion 41.

Figure 4:
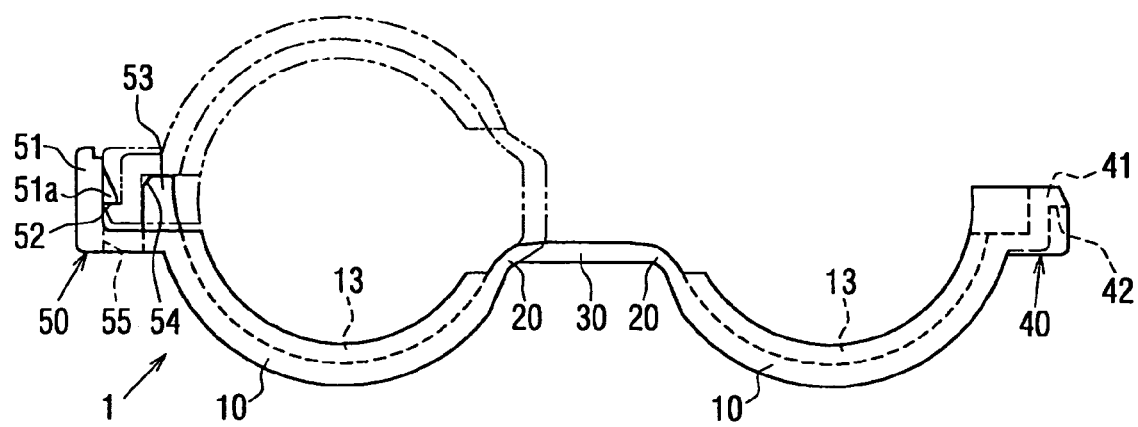
FIG. 4 is a front view showing a shape of the clamp 1 when being formed according to the first embodiment.

According to this embodiment, the clamp 1 is manufactured at the arrangement state shown in FIG. 4. Specifically, the clamp 1 is manufactured at the opening state, where the engagement surface 42 positioned at the first end 40 is substantially inverted with respect to the position thereof at the closed state of the clamp 1. That is, the clamp 1 is deployed at substantial 1800 so that the engagement surface 42 faces downward, when being manufactured.

Accordingly, the clamp 1 can be readily formed through a two-parted die without using a slide construction, even when the clamp 1 is provided with the multiple concave and convex parts such as the engagement portion 41 having the engagement surface 42, the engagement protrusion portion 51, the positioning rib portion 53, the groove 13 and the like.

According to this embodiment, the hook portion 51a of the engagement protrusion portion 51 can be also formed by the two-parted die without using the slide construction, because of an arrangement of the opening 55. Therefore, the clamp 1 can be manufactured by the two-parted die without using the slide construction, so that the manufacture cost of the clamp 1 is reduced.

Next, the connection operation of the piping members 8 and 9 through the clamp 1 with the above-described construction will be described.

At first, as shown in FIG. 2, one of the male piping member 8 and the female piping member 9 is moved in the axis direction thereof, so that the male end 81 of the male piping member 8 is inserted into the female end 91 of the female piping member 9. Thus, the flange portion 82 of the male piping member 8 contacts the flange portion 92 of the female piping member 9.

Then, the clamp 1 is arranged so that a part of the holding portion 10 holds substantially circumferential halves of the flanges 82 and 92 (which contact each other). The part of the holding portion 10 is disposed between the second end 50 and the hinge portion 20.

Figure 5:
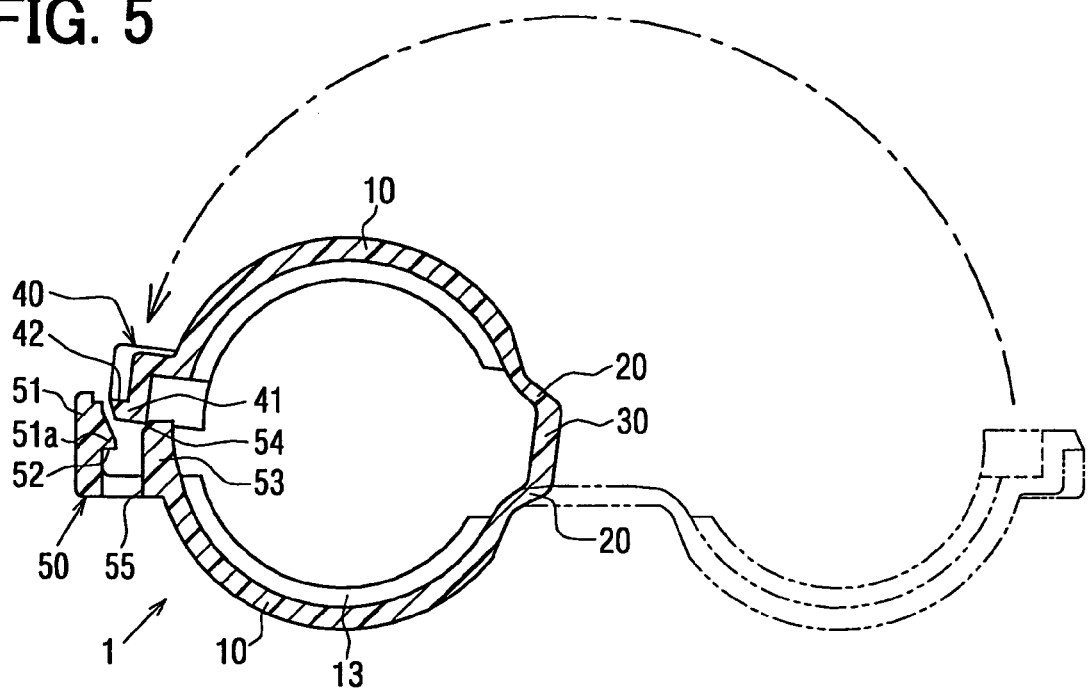
FIG. 5 is a diametrically cross-sectional view showing an attachment operation of the clamp 1 according to the first embodiment.

Thereafter, the side of the first end 40 of the holding portion 10 is rotated toward the second end 50 of the holding portion 10, as shown in FIG. 5. Then, the engagement portion 41 of the first end 40 is introduced by the introduction surface 54 to be inserted into the gap between the engagement protrusion portion 51 and the positioning rib portion 53. Thus, the clamp 1 (holding portion 10) is closed.

As described above, the positioning rib portion 53 protrudes in the clamp-opening direction with respect to the engagement surface 52 of the engagement protrusion portion 51. Therefore, the first end 40 can be substantially positioned by the positioning rib portion 53, before the engagement surface 42 of the first end 40 is engaged with the engagement surface 52 of the second end 50.

According to this embodiment, the positioning rib portion 53 has the larger stiffness than the engagement protrusion portion 51. Therefore, when the engagement portion 41 of the first end 40 is inserted to the inner side of the engagement protrusion portion 51, the engagement protrusion portion 51 is bent so that the engagement portion 41 enters the lower side (as shown in FIG. 5) of the hook portion 51a while the positioning rib portion 53 substantially positions the first end 40.

Thus, the engagement surface 42 of the first end 40 is engaged with the engagement surface 52 of the second end 50, so that the clamp 1 is closed. In this case, the other substantial circumferential half of the flanges 82 (92) is held by the holding portion 10 between the first and 40 and the hinge portion 20.

Thus, the holding portion 10 circumferentially clamps the whole flanges 82 and 92, so that the piping members 8 and 9 are axially fixed.

When the piping members 8 and 9 are to be disengaged from each other, the tip of the engagement protrusion portion 51 of the second portion 50 is biased toward the diametrically outer side of the holding portion 10 so that the first and second ends 40, 50 can be readily disengaged from each other.

According to this embodiment, the clamp 1 is provided with the multiple (e.g., two) hinges 20 which protrude toward the diametrically outer side of the clamp 1. Thus, the variation of the outer diameters of the flanges 82 and 92 is accommodated. Therefore, as shown in FIG. 1, the protrusion amount 'A' of the each hinge portion 20 with respect to an outer surface of the holding portion 10 can be reduced. Accordingly, the space occupied by the clamp 1 at the joint part of the piping members 8 and 9 can be reduced.

Moreover, as shown in FIG. 1, the two hinge portions 20 are arranged close to each other, and connected with each other through the intermediate portion 30, which has the larger stiffness. Therefore, the first end 40 can be readily rotated toward the side of the second end 50, so that the engagement surfaces 42 and 52 are engaged with each other. Thus, the clamp 1 is closed. Therefore, the clamp 1 can be mounted by a one-touching operation.

That is, according to this embodiment, the angle "B" (with a criterion of the center of the holding portion 10 at the closing state) between the two hinges 20 is set to be, for example, substantial 30°. If this angle exceeds 40°, a stable rotation locus (as indicated in FIG. 5) of the first end 40 toward the second end 50 cannot be obtained, so that the clamp 1 can not be mounted by the one-touching operation. Therefore, preferably, the angle between the two hinge portions 20 is set to be smaller than or equal to 40°. Further preferably, this angle is set to be smaller than or equal to 30°.

Moreover, according to this embodiment, the positioning rib portion 53 protrudes in the clamp-opening direction to exceed the engagement surface 52, and the introduction surface 54 (e.g., having the incline shape) is formed at the positioning rib portion 53 to introduce an insertion of the first end 40. Accordingly, the mounting performance of the clamp 1 is improved.

Second Embodiment

In the above-described first embodiment, each of the hinge portions 20 protruding toward the diametrically outer side of the holding portion 10 is provided with the thin part (at side of holding portion 10) with a smaller thickness than that of the hinge portion 20 at the side of the intermediate portion 30. In this case, the hinge portion 20 is resiliently deformable at the thin part thereof disposed at the side of the holding portion 10.

Figure 6:
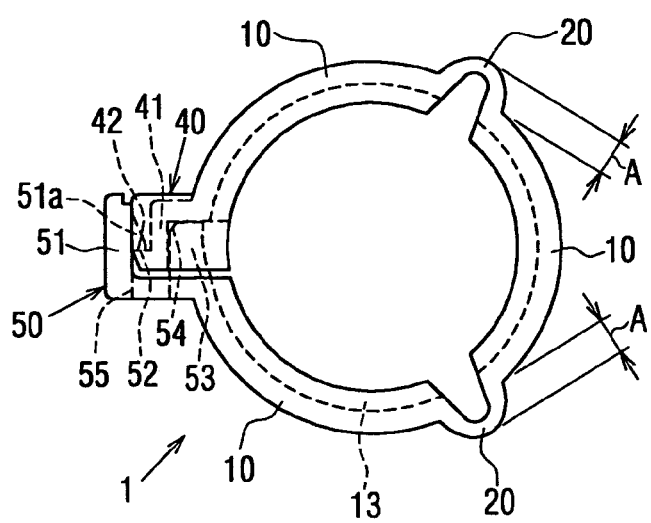
FIG. 6 is a front view showing a construction of a clamp 1 according to a second embodiment of the present invention.

According to a second embodiment of the present invention, the holding portion 10 can be also shaped as shown in FIG. 6. In this case, the holding portion 10 is provided with the multiple hinge portions 20, each of which protrudes toward the diametrically outer side of the holding portion 10. The hinge portion 20 has a thin part positioned at the protrusion side tip thereof, which is located at an approximate middle of the hinge portion 20. Thus, the protrusion amount 'A' of the each hinge portion 20 can be reduced, as compared with the related art.

In this case, the mounting performance of the clamp 1 can be improved by setting the angle (which is substantial 1200 in FIG. 6) between the hinge portions 20 to approach a value which is smaller than or equal to 40°.

Other Embodiment

Although the present invention has been fully described in connection with the preferred embodiments thereof with reference to the accompanying drawings, it is to be noted that various changes and modifications will become apparent to those skilled in the art.

Figure 7:
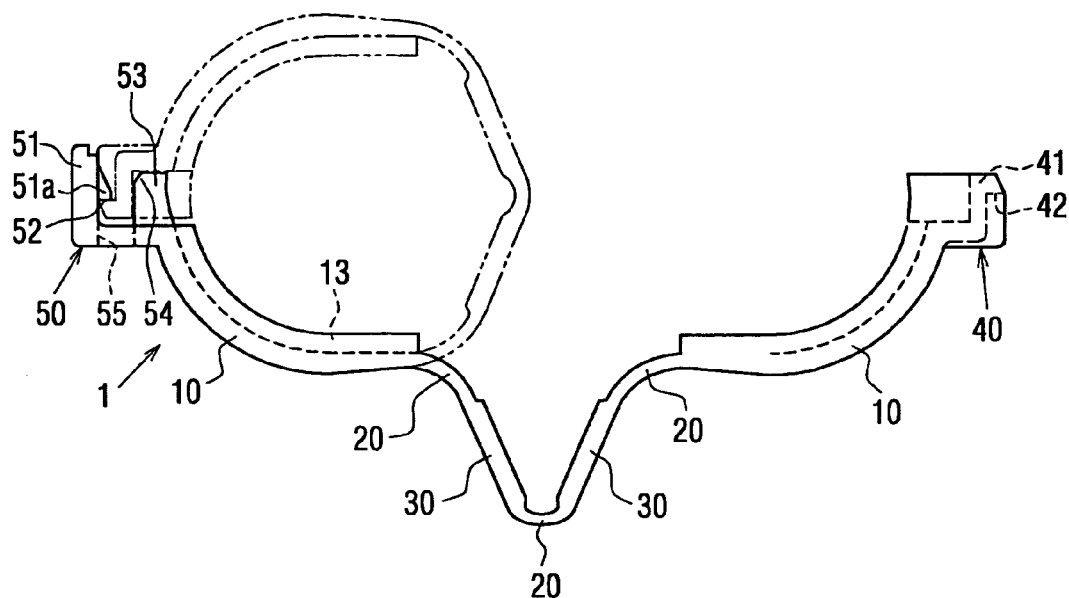
FIG. 7 is a front view showing a construction of a clamp 1 according to other embodiment of the present invention.

FIG. 1 shows the clamp 1 which is provided with the two hinge portions 20. FIG. 7 shows the clamp 1 having the three hinge portions 20, which are constructed similarly to those shown in FIG. 1. Thus, the protrusion amount 'A' of the each hinge portion 20 can be further reduced. However, when the number of the hinge portions 20 is excessively increased, the mounting performance of the clamp 1 will impaired and the mounting of the one-touching operation will become difficult.

Figure 8:
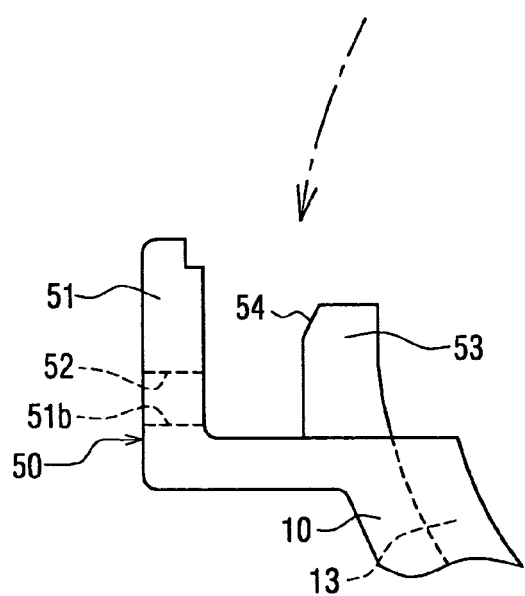
FIG. 8 is an enlarged view showing a construction of an end of a clamp 1 according to the other embodiment.
Figure 9:
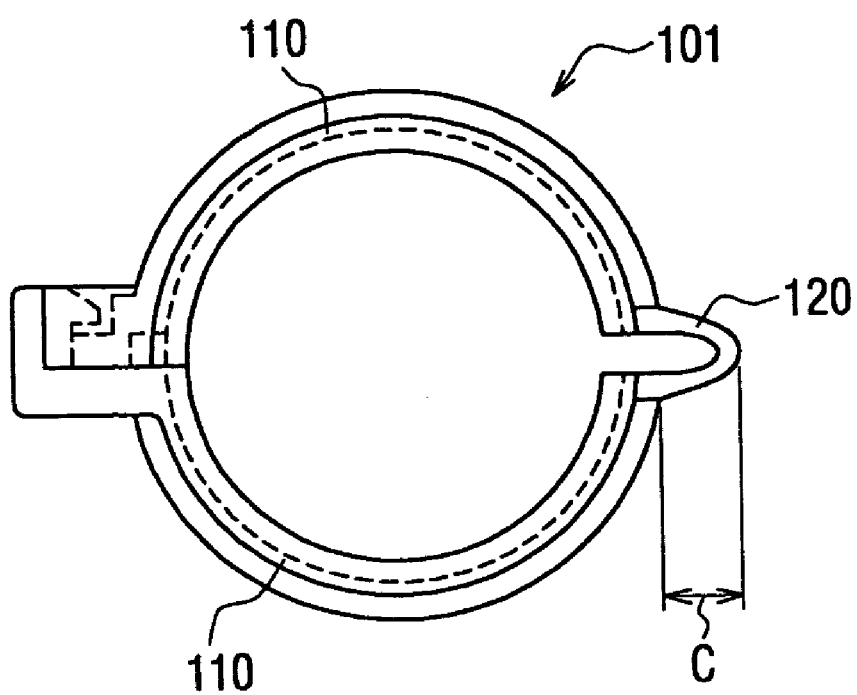
FIG. 9 is a front view showing a construction of a clamp according to a related art.

In the first embodiment, the engagement surface 52 of the second end 50 is formed at the hook portion 51$a$, which protrudes toward the diametrically inner side of the holding portion 10. However, referring to FIG. 8, the engagement surface 52 can be also formed at an inner wall of a hole portion 51$b$, which penetrates the engagement protrusion portion 51 in the substantially diametrical direction of the holding portion 10. In this case, the positioning rib portion 53 protrudes in the clamp-opening direction to exceed the engagement surface 52 of the engagement protrusion portion 51. Thus, the mounting performance of the clamp 1 can be improved. However, the construction described in the first embodiment has the merit that the simple two-parted die can be used.

Moreover, in the first embodiment, the hinge portion 20 having the flexion shape is resiliently deformable to function as a hinge when the clamp 1 is closed/opened, and to accommodate the variation of the outer diameters of the flange portions 82 and 92. However, the clamp 1 can be also provided with a hinge function portion functioning as a hinge, and a variation accommodating function portion for accommodating the variation of the outer diameters of the flange portions 82 and 92. The hinge function portion and the variation accommodating function portion are separately arranged at different positions from each other.

Furthermore, in the first embodiment, the piping members 8 and 9 are diameter-enlarged to respectively form the flange portions 82 and 92. However, the flange portions 82 and 92 can be also respectively joined to the piping members 8 and 9.

Such changes and modifications are to be understood as being in the scope of the present invention as defined by the appended claims.

What is claimed is:

1. A pipe joint clamp for connecting a first piping member and a second piping member, each of which has a flange portion at an axial end thereof, the pipe joint clamp comprising:
   a circular holding portion, in which the flange portions are held to be clamped;
   a plurality of flexion portions which protrude from the holding portion toward a diametrically outer side of the holding portion; and
   a first intermediate portion disposed between two of the flexion portions, the first intermediate portion having a larger stiffness than the flexion portions; wherein
   each of the flexion portions has a bending shape which is resiliently deformable so that an inner diameter of the holding portion is changeable.

2. The pipe joint clamp according to claim 1, wherein:
   the holding portion has a first circumferential end and a second circumferential end, which are separated from each other and capable of being engaged with each other through engagement surfaces, the engagement surfaces being respectively formed at the first circumferential end and the second circumferential end;
   when the holding portion is attached to the flange portions, the engagement surfaces are engaged with each other so that the holding portion is closed; and
   when the holding portion is detached from the flange portions, the engagement surfaces are disengaged from each other so that the holding portion is opened.

3. The pipe joint clamp according to claim 2, wherein each of the flexion portions is resiliently deformed as a hinge portion, when the holding portion is closed/opened.

4. The pipe joint clamp according to claim 2, wherein:
   the holding portion, from which the flexion portions protrude, is formed at an open state, where the engagement surface of the first circumferential end is substantially inverted with respect to an arrangement of the engagement surface at a closed state of the holding portion; and when the holding portion is to be closed, the first circumferential end is rotated toward the second circumferential end.

5. The pipe joint clamp according to claim 4, further comprising:
an engagement protrusion portion which is arranged at the second circumferential end, the engagement surface of the second circumferential end being formed at the engagement protrusion portion; and
a positioning rib portion, which is arranged at the second circumferential end to position the first circumferential end when the holding portion is closed, wherein
the positioning rib portion exceeds the engagement surface of the engagement protrusion portion in an opening direction of the holding portion.

6. The pipe joint clamp according to claim 5, wherein the positioning rib portion has a larger stiffness than that of the engagement protrusion portion.

7. The pipe joint clamp according to claim 5, wherein
the positioning rib portion has an introduction surface, which is positioned at a tip side thereof and shaped to correspond to a rotation locus of the first circumferential end, the tip being disposed at a side of the first circumferential end at the closed state of the holding portion.

8. The pipe joint clamp according to claim 5, wherein:
the engagement protrusion portion is located at the diametrically outer side of the holding portion with respect to the positioning rib portion; and
the engagement protrusion portion has a hook portion, which protrudes from the engagement protrusion portion toward a diametrically inner side of the holding portion.

9. The pipe joint clamp according to claim 1, wherein the intermediate portion, which is positioned between two of the flexion portions defines a groove within which the flange portions are held to be clamped.

10. The pipe joint clamp according to claim 1, wherein:
the holding portion has a groove, which is formed at a diametrically inner surface of the holding portion and extends in the circumference direction of the holding portion; and
the flange portions are held in the groove.

11. The pipe joint clamp according to claim 1, wherein each of the flexion portions has a smaller thickness than the intermediate portion.

12. The pipe joint clamp according to claim 11, wherein the thickness of the intermediate portion is substantially double that of a part of one of the flexion portions, the part of the one of the flexion portions being disposed at a side of the holding portion.

13. The pipe joint clamp according to claim 11, wherein:
each of the flexion portions is resiliently deformable in such a manner that a circumferential length of the flexion portion is enlarged, so that the inner diameter of the holding portion is changeable.

14. The pipe joint clamp according to claim 1, wherein an angle with a criterion of a center of the holding portion between the flexion portions is set to be smaller than or equal to 30°.

15. The pipe joint clamp according to claim 1, wherein an angle with a criterion of a center of the holding portion between the flexion portions is set to be smaller than or equal to 40°.

16. The pipe joint clamp according to claim 1, wherein the holding portion and the flexion portions protruding from the holding portion are made of a resin.

17. The pipe joint clamp according to claim 1, wherein the plurality of flexion portions includes a first flexion portion and a second flexion portion, the first intermediate portion being disposed between the first and second flexion portions.

18. The pipe joint clamp according to claim 1, wherein the plurality of flexion portions includes a first flexion portion, a second flexion portion and a third flexion portion, the first intermediate portion being disposed between the first and second flexion portions, the pipe joint clamp further comprising a second intermediate portion disposed between the second and third flexion portions, the second intermediate portion having a larger stiffness than the flexion portions.

19. A pipe joint clamp for connecting a first piping member and a second piping member, each of which has a flange portion at an axial end thereof, the pipe joint clamp comprising:
a circular holding portion, in which the flange portions are held to be clamped; and
a plurality of flexion portions which protrude from the holding portion toward a diametrically outer side of the holding portion, wherein;
each of the flexion portions has a bending shape which is resiliently deformable so that an inner diameter of the holding portion is changeable;
the holding portion has a first circumferential end and a second circumferential end, which are separated from each other and capable of being engaged with each other through engagement surfaces, the engagement surfaces being respectively formed at the first circumferential end and the second circumferential end;
when the holding portion is attached to the flange portions, the engagement surfaces are engaged with each other so that the holding portion is closed;
when the holding portion is detached from the flange portions, the engagement surfaces are disengaged from each other so that the holding portion is opened;
the holding portion, from which the flexion portions protrude, is formed at an open state, where the engagement surface of the first circumferential end is substantially inverted with respect to an arrangement of the engagement surface at a closed state of the holding portion; and
when the holding portion is to be closed, the first circumferential end is rotated toward the second circumferential end, the pipe joint clamp further comprising:
an engagement protrusion portion which is arranged at the second circumferential end, the engagement surface of the second circumferential end being formed at the engagement protrusion portion; and
a positioning rib portion, which is arranged at the second circumferential end to position the first circumferential end when the holding portion is closed, wherein
the positioning rib portion exceeds the engagement surface of the engagement protrusion portion in an opening direction of the holding portion;
the positioning rib portion protrudes from the second circumferential end toward an opening-direction side of the holding portion, and extends in a substantial circumference direction of the holding portion.

20. The pipe joint clamp according to claim 1, wherein the first intermediate portion is disposed circumferentially between two of the flexion portions.

* * * * *